(12) United States Patent
Pathak et al.

(10) Patent No.: US 11,646,987 B1
(45) Date of Patent: May 9, 2023

(54) SYSTEM AND METHOD FOR ADAPTIVE MESSAGE DISTRIBUTION

(71) Applicant: Kaarya LLC, Long Beach, CA (US)

(72) Inventors: Animesh Pathak, Long Beach, CA (US); Ujjual Nath, Manhattan Beach, CA (US); Akshay Tyagi, Noida (IN); Satyendra Singh, Long Beach, CA (US)

(73) Assignee: KAARYA LLC, Long Beach, CA (US)

( * ) Notice: Subject to any disclaimer, the term of this patent is extended or adjusted under 35 U.S.C. 154(b) by 0 days.

(21) Appl. No.: 17/716,993

(22) Filed: Apr. 8, 2022

Related U.S. Application Data

(60) Provisional application No. 63/172,609, filed on Apr. 8, 2021.

(51) Int. Cl.
*H04L 51/216* (2022.01)
*H04L 51/234* (2022.01)
*H04L 51/212* (2022.01)

(52) U.S. Cl.
CPC .......... *H04L 51/216* (2022.05); *H04L 51/212* (2022.05); *H04L 51/234* (2022.05)

(58) Field of Classification Search
CPC .... H04L 51/216; H04L 51/212; H04L 51/234
See application file for complete search history.

(56) References Cited

U.S. PATENT DOCUMENTS

| 5,754,639 A | * | 5/1998 | Flockhart | H04M 3/5232 379/112.01 |
| 6,018,579 A | * | 1/2000 | Petrunka | H04M 3/5125 379/221.13 |
| 6,535,600 B1 | * | 3/2003 | Fisher | H04M 3/5233 379/265.12 |
| 6,611,590 B1 | * | 8/2003 | Lu | H04M 3/51 379/265.09 |
| 6,798,876 B1 | * | 9/2004 | Bala | H04M 3/5233 379/265.12 |
| 7,023,979 B1 | * | 4/2006 | Wu | H04M 3/5233 379/265.11 |
| 8,254,555 B1 | * | 8/2012 | Noble, Jr. | H04M 3/5158 379/265.09 |
| 9,072,016 B1 | * | 6/2015 | Abou-El-Ella | G06Q 30/016 |
| 9,635,181 B1 | * | 4/2017 | McGann | H04M 3/5238 |

(Continued)

*Primary Examiner* — Sargon N Nano

(57) ABSTRACT

The problem of ensuring coverage for an inbound communication from a customer while also preventing concurrent responses from members of the agent group tasked with said coverage is solved by a system where a customer's thread is owned for routing purposes not by a single user but by a group of users, only one of whom is allowed to communicate with the customer until a timer expires or the thread is explicitly unlocked. Communication channels may include text messaging, voice telephony and email. In various embodiments, an adaptive rules engine is utilized to route incoming customer communications as well as outbound responses. A combination of communication/message locks and communication/messaging cache levels are used in some embodiments to provide communication/messaging coverage and to resolve competition between responding agents to address concurrency. Customer/agent communications which use multiple communication channels are threaded in an agent user interface.

21 Claims, 17 Drawing Sheets

(56) References Cited

U.S. PATENT DOCUMENTS

| | | | | |
|---|---|---|---|---|
| 9,680,996 B2* | 6/2017 | Kumar | ................ | H04M 3/5191 |
| 9,942,189 B2* | 4/2018 | Green | ................ | G06V 40/172 |
| 10,229,370 B1* | 3/2019 | Merritt | ................ | G06N 20/00 |
| 10,257,357 B1* | 4/2019 | Merritt | ................ | G06N 5/022 |
| 10,649,790 B1* | 5/2020 | Ingegneri | ............ | G06F 9/4405 |
| 11,176,461 B1* | 11/2021 | Merritt | ................ | H04M 3/5233 |
| 2006/0109975 A1* | 5/2006 | Judkins | ............... | H04M 3/5233 |
| | | | | 379/265.02 |
| 2006/0115072 A1* | 6/2006 | Kessinger | ........... | H04M 3/5175 |
| | | | | 379/265.03 |
| 2007/0003042 A1* | 1/2007 | Paden | ................ | H04M 3/5166 |
| | | | | 379/211.02 |
| 2007/0206764 A1* | 9/2007 | Keren | ................ | G06F 11/3466 |
| | | | | 714/E11.2 |
| 2007/0206766 A1* | 9/2007 | Keren | ................ | H04M 3/5175 |
| | | | | 379/265.01 |
| 2007/0206767 A1* | 9/2007 | Keren | ................ | H04M 3/5175 |
| | | | | 379/265.01 |
| 2008/0118051 A1* | 5/2008 | Odinak | ................... | H04M 3/51 |
| | | | | 379/265.09 |
| 2010/0086120 A1* | 4/2010 | Brussat | ............... | H04M 3/5233 |
| | | | | 379/265.12 |
| 2013/0039483 A1* | 2/2013 | Wolfeld | ................. | H04M 3/00 |
| | | | | 379/265.03 |
| 2015/0201078 A1* | 7/2015 | Khouri | ................ | H04M 3/5232 |
| | | | | 379/265.12 |
| 2017/0041464 A1* | 2/2017 | Sharma | ............... | H04M 3/4285 |
| 2017/0374197 A1* | 12/2017 | Rumpf | ................ | H04M 3/5125 |
| 2020/0220835 A1* | 7/2020 | Kwatra | ................ | H04L 51/234 |
| 2020/0358900 A1* | 11/2020 | Carty | ................ | H04M 3/2281 |
| 2022/0150355 A1* | 5/2022 | Matula | ................ | H04M 19/041 |

\* cited by examiner

Customer 207

| ID | Name | DealerID |
|----|------|----------|
| 42 | Sheldon Cooper | 1 |
| 45 | Raj K | 2 |
| ... | ... | ... |

CustomerCommunication 209

| ID 211 | CommValue 213 | CommType 215 | CustomerID 217 |
|----|-----------|----------|------------|
| 1 | sc@foo.com | Email | 42 |
| 2 | 2132132133 | Phone | 42 |
| 3 | 2132132134 | Phone | 42 |
| 4 | rk@bar.com | Email | 45 |
| ... | ... | ... | ... |

Fig. 21

SYSTEM AND METHOD FOR ADAPTIVE MESSAGE DISTRIBUTION

RELATED APPLICATIONS

This application claims benefit of U.S. provisional patent application 63/172,609 of the same title, filed on Apr. 8, 2021, the entirety of which is incorporated here.

FIELD OF THE INVENTION

The field of the invention is communication systems including the adaptive distribution and routing of interactions between clients and agents.

BACKGROUND

The management of interactions and communications between customers and businesses is a longstanding challenge across a wide spectrum of industries. To improve a customer's (client's) experience it is widely understood that the waiting time for interacting with a human service agent should be minimized. This is commonly addressed by the use of "call centers" where incoming customer calls are entered into a queue which is serviced by the next available agent. This process is referred herein to call "coverage" an indication of the call center's ability for incoming requests to be "covered" by a group of agents at the call center. Maintaining exclusivity of communications between an agent and a customer presents additional technical problems, as do multi-channel forms of communication such as messaging, voice telephony and email.

SUMMARY

The problem of ensuring coverage for an inbound interactions from a customer, such as text-based communication, while also preventing concurrent responses from members of the agent group tasked with said coverage is solved by a system where a customer's thread is owned for routing purposes not by a single user (agent) but by a group of users (agents), only one of whom is allowed to communicate with the customer until a timer expires. In various embodiments, an adaptive rules engine is utilized to route incoming customer communications as well as outbound responses. In regards to the management of text-based communications, a combination of message locks and messaging cache levels are used in some embodiments to provide messaging coverage and to resolve competition between responding agents to resolve concurrency. Extending the rules engine to apply rules to multiple groups of agents allows configurations which allow both coverage and ownership advantages simultaneously. In certain use cases, a customer inquiry or communication may be best sent to (owned by) a specific group of agents, but not a specific agent. In other use cases, ownership of the thread by an individual agent may be necessary to maintain communication continuity and/or efficiency. Among the advantages of the system and method disclosed are the abilities to dynamically and adaptively route incoming messages which do not have a particular individual recipient named and yet the system is capable of routing the message to particular individual agent recipients or particular sets or groups of agents such that the incoming messages may be acted upon in a flexible process that optimizes the efficient coverage of incoming messages and resolves conflicts between recipients (agents) acting upon or responding to the messages. To perform such dynamic and adaptive routing, the system relies upon messaging history, interaction history, transactional history, message content, timing and recipient (agent) actions taken. For multi-channel communications which include additional channels of interactions or communications such as voice and email, the system threads the various channels of communications together for the agent user interface.

BRIEF DESCRIPTION OF THE DRAWINGS

FIG. 21 shows an exemplar entity-relationship (ER) diagram which includes tables corresponding to customers and communication channel specific identifiers.

DESCRIPTION

The implementation occurs in two parts: the "agent group" part which notifies multiple agents of the need to respond to a customer, and the "thread lock" part, which allows only one agent to send a message to a customer. In the below explanation, a basic component structure is provided, followed by a detailed demonstration of an application embodiment as shown through a typical user interface interaction between a customer and servicing agents. Note that although messaging is described as the exemplar embodiment, the process is applied to all relevant interactions or communications, such as voice and email.

Figure 1:
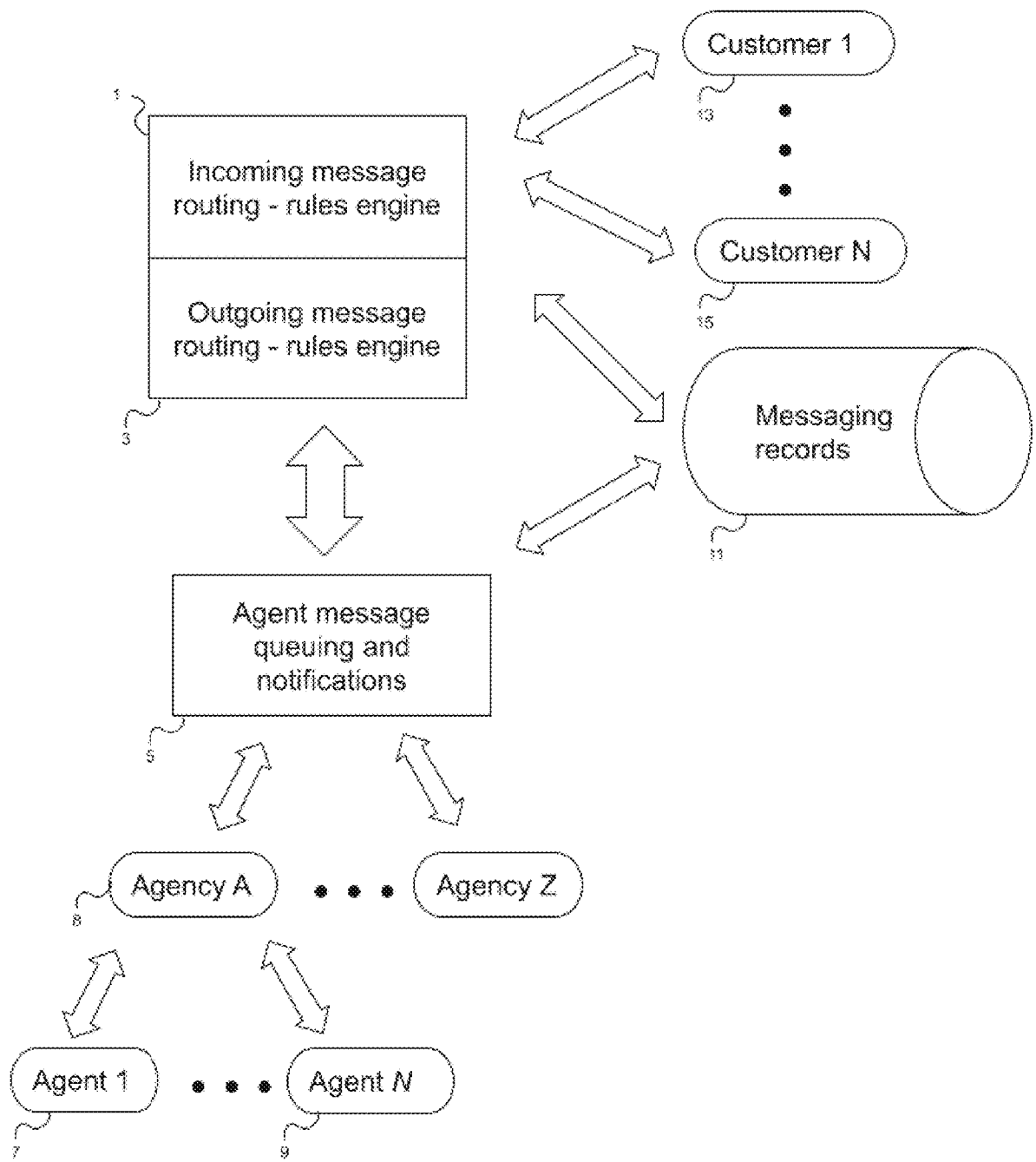
FIG. 1 shows a component diagram of a basic embodiment of the disclosed system.

FIG. 1 shows an exemplar diagram which indicates the relative system components. In this depiction of the system components, incoming messages or requests from customers 13 15 are processed by an incoming rules engine router 1 which applies a set of rules including those detailed below in certain embodiments on how to distribute or rout incoming messages. Processed inbound messages are then distributed or routed to individual agents 7 9 at a particular agency 8. In certain embodiments these messages are maintained as "threads" particular to a customer's communications, but are also sent to a notification handler which distributes the message to individual agents 7 9 or groups of agents within an agency 8 or across agencies 6 8. Messaging records 11 are kept, as detailed below, with respect to both the customer communication thread as well as the status of a particular notice, request or conversation. Additional details of an exemplar rules engine are provided below.

In certain embodiments, the system is configurable to assign "thread ownership" to individual agents, groups of agents, or individual group member agents. Configuration may include rules which assign communication threads to an individual agent, such as when that agent has been in recent contact with a customer, or to a group, such as a new customer making an appointment. Such thread assignment may be performed manually or automatically according to the rules engine. In various embodiments, the thread owner (agent or group) may be assigned according to message or communication content, context, or the communication history of the customer/originating entity. Further examples are provided below including a portion of an exemplar entity-relationship (E-R) diagram.

As explained earlier, a goal of various system embodiments is to maintain "coverage" of incoming communications, be it to a specific group or set of groups of agents to provide immediate or near immediate responsiveness to the communication, while simultaneously maintaining efficient and relevant communication attention by maintaining "thread ownership" to the relevant specific agent or group, and routing successive messaging to the same thread owner. As a consequence of such message routing, various situations arise which may lead to competing or conflicting messaging, such as when multiple agents have elected to the same incoming message query. In certain embodiments, such conflicting potential agent communications are resolved by the thread locking levels described herein. The system's ability to detect message composition prior to actual sending a message is one such messaging conflict resolution which improves the efficient use of both agent and customer time.

Figure 2:
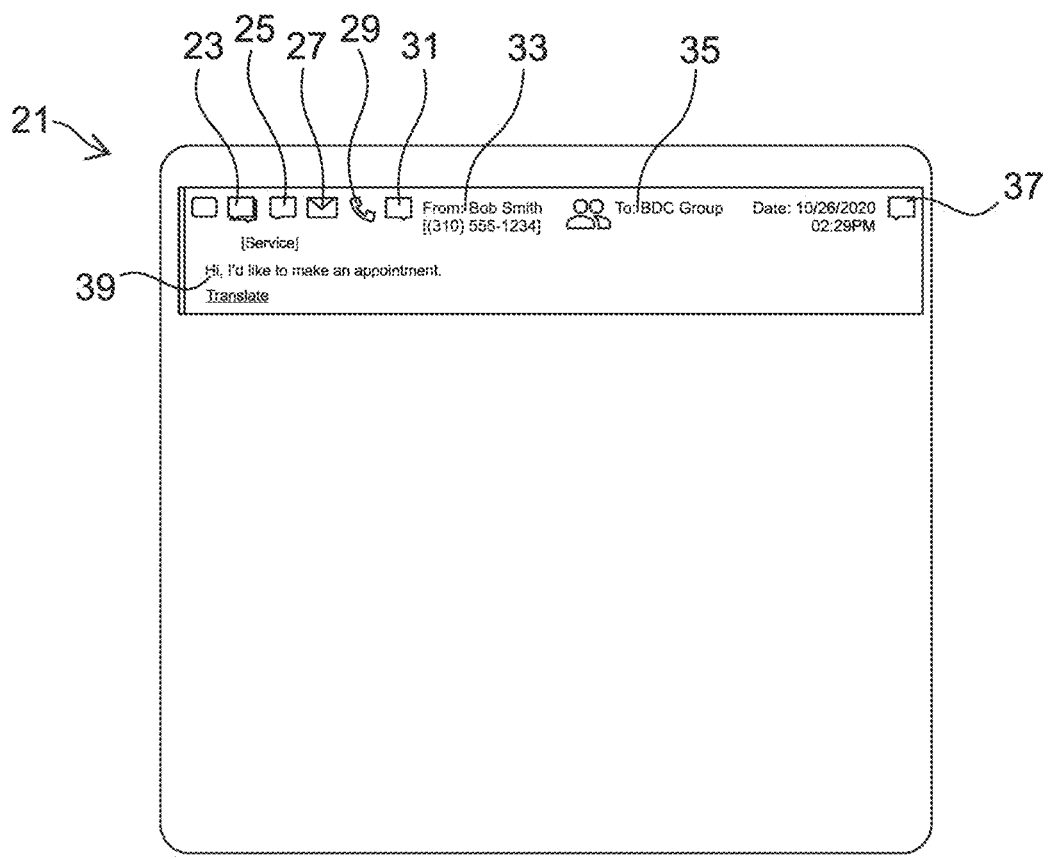
FIG. 2 shows a screenshot of an exemplar agent notification of an incoming request from a customer.

A detailed presentation of user (agent) facing functionality is provided here as an outline of exemplar system functionality. In various embodiments, a notification user interface is provided for agents. This notification user interface may be implemented by means of a compiled personal computer application, a smartphone application or app, a "thin" application, or a browser-based web application on either personal devices, such as a smartphone, tablet or personal computer. FIG. 2 shows an exemplar notification user interface 21 for agents. A number of elements showing additional functions are shown. In this screen, an incoming notification of a customer request or inquiry is shown 39 including the identity or the customer 33 and the date and time of the message 37. From this user interface, the agent has a number of options, including viewing the communication history with the customer 23, responding to the message by text message 25, email 27 and telephone 29. In this example, the message has been distributed to a group of agents, the service BDC group 35, and for other agents in the group (or agency) the notification will look identical.

Figure 3:
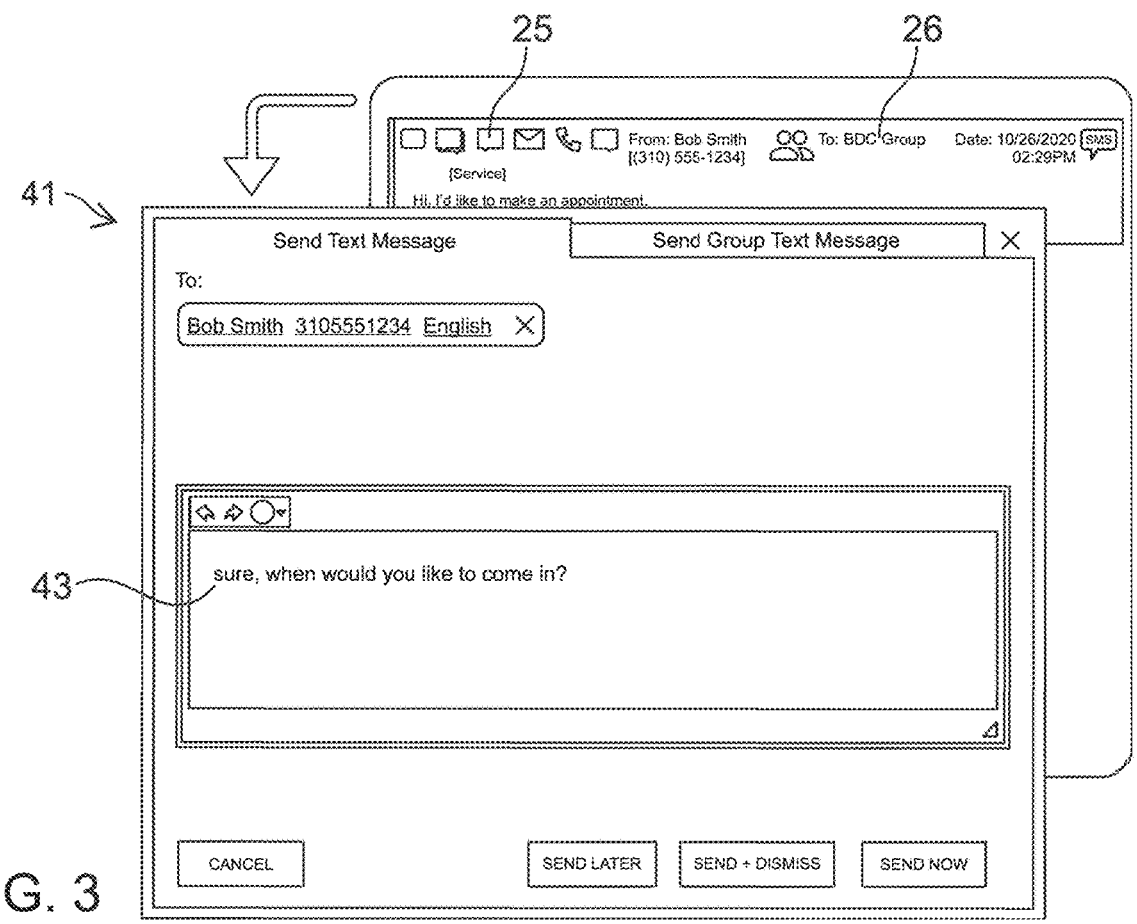
FIG. 3 shows a screenshot of an exemplar individual agent drafting a response to a customer request.

FIG. 3 shows an exemplar user interface, in this case of an agent responding to the customer inquiry. After clicking on the chosen response mode 25 for text messages, a pop-up window appears 41 which allows an agent to compose his or her response to the customer 43. Once the agent's response is composed, the interface provides a mechanism for sending the message 45. In this example, the agent composing the response is "Tom Jones", referred to herein as either the primary agent or responding agent.

Figure 4:
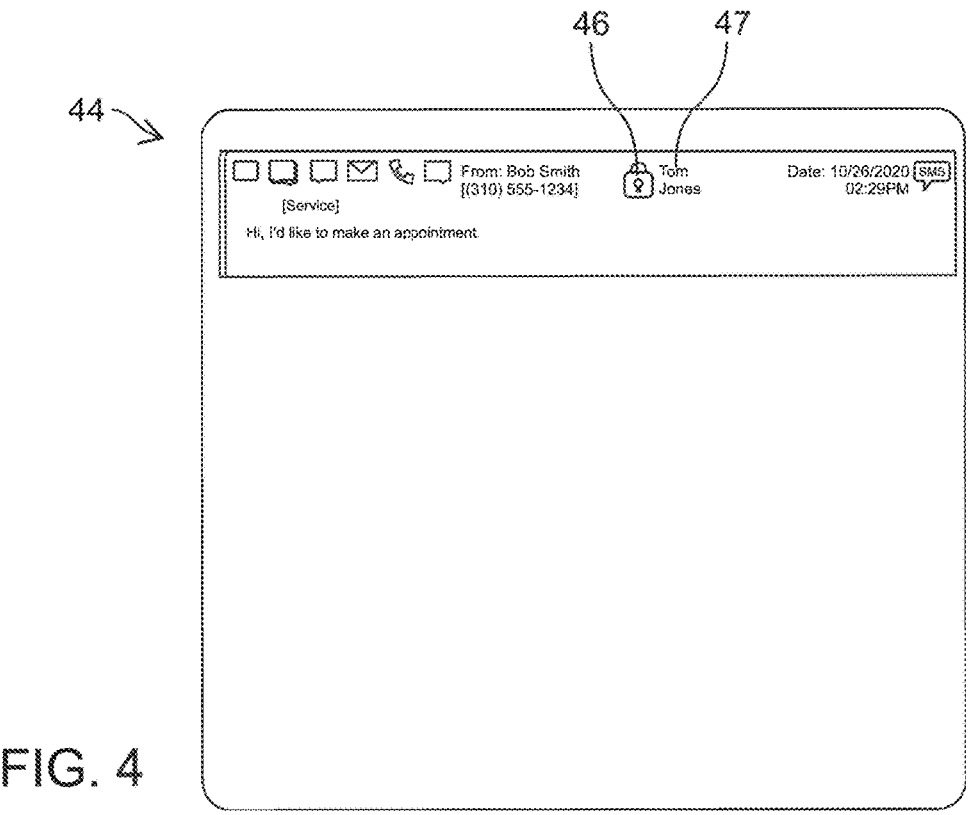
FIG. 4 shows a screenshot of an agent's notification display showing the lock indication for another agent in the process of responding to the customer request.

FIG. 4 shows an exemplar agent notification user interface window 44, which in this instance indicates that a response is being composed by another agent 47 (Tom Jones) and is temporarily locked 46 during composition of the message. Implementation of this "lock" level for messaging prevents multiple agents from responding to the customer, but allows for an agent to initiate composition of the response with the option of cancelling the composition before the message has been sent.

Figure 5:
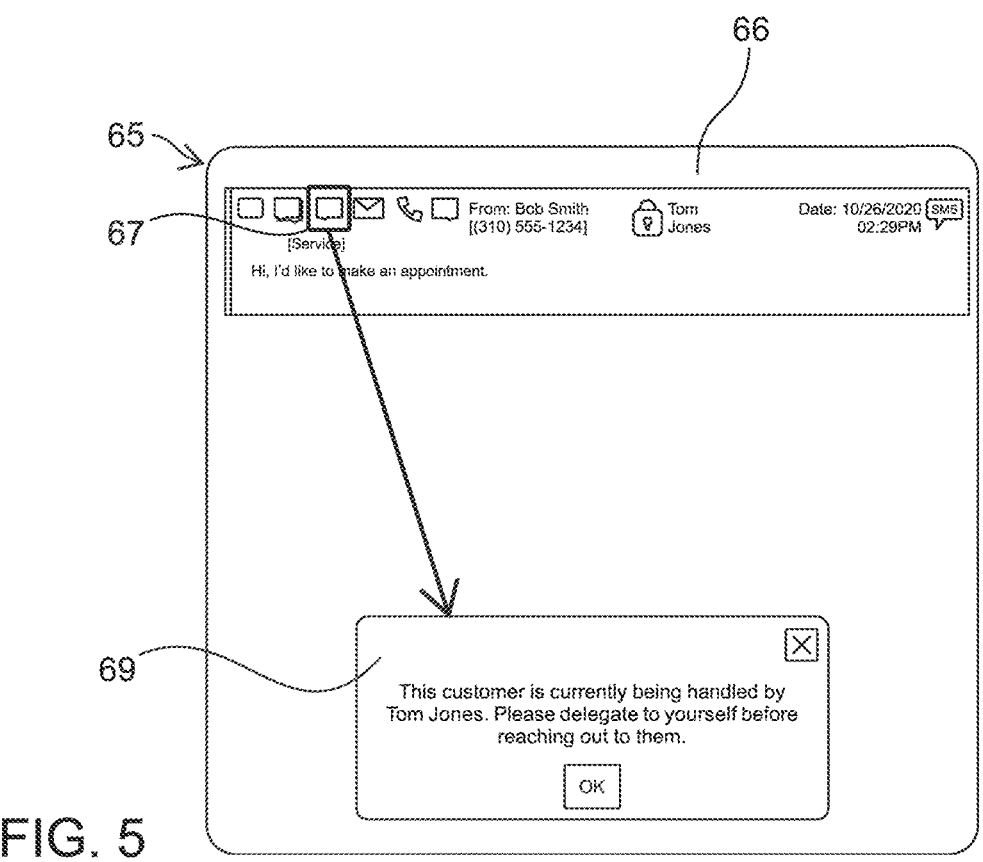
FIG. 5 shows a screenshot of an agent's notification display after the agent responds to a request.

Shown in FIG. 5 notification interface 65, if the secondary or non-responding agent ignores the "in process" lock notification 66 and instead clicks on one of the response icons, such as the one for text message response 67, an error message 69 is triggered by the system and the non-responding agent is prevented from responding.

Figure 6:
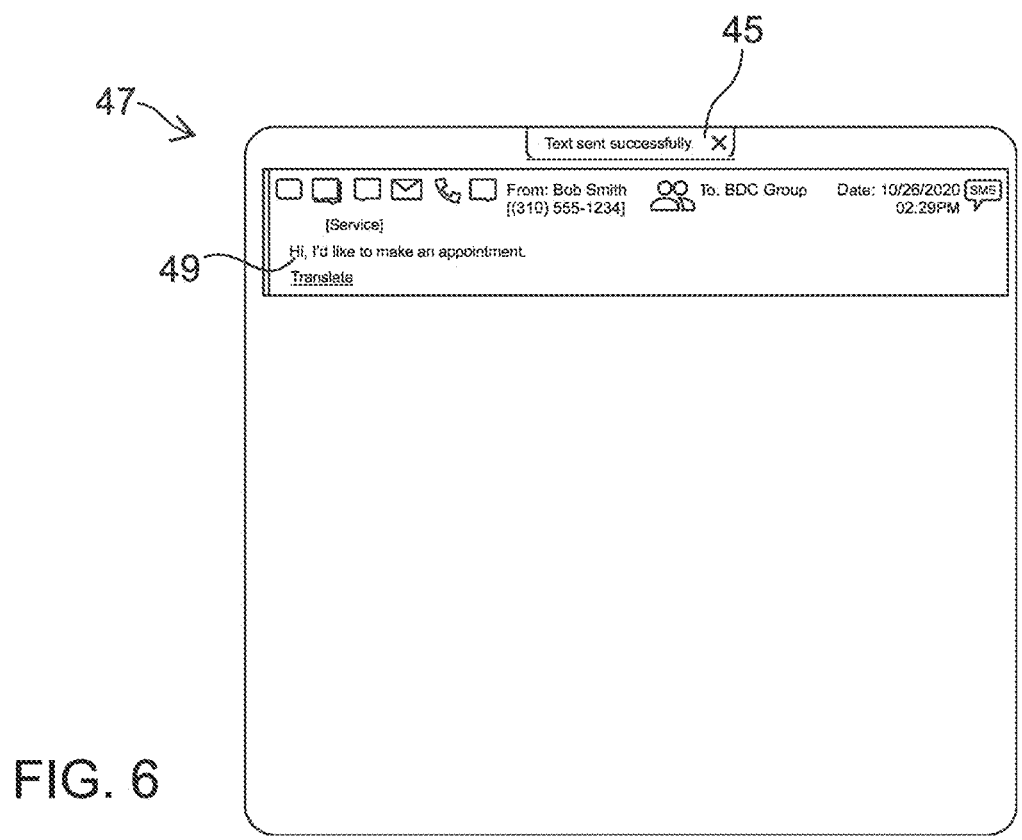
FIG. 6 shows a screenshot of a secondary agent's notification display showing the removal of a request notification following a primary agent's response being sent.

Shown in FIG. 6, once the sending agent from this example actually sends his or her response message by clicking on "send" in the message composition interface (FIG. 3 45), the composition interface (see FIG. 3 41) is removed and an indication 48 that a response has been sent is indicted to the agent.

Figure 7:
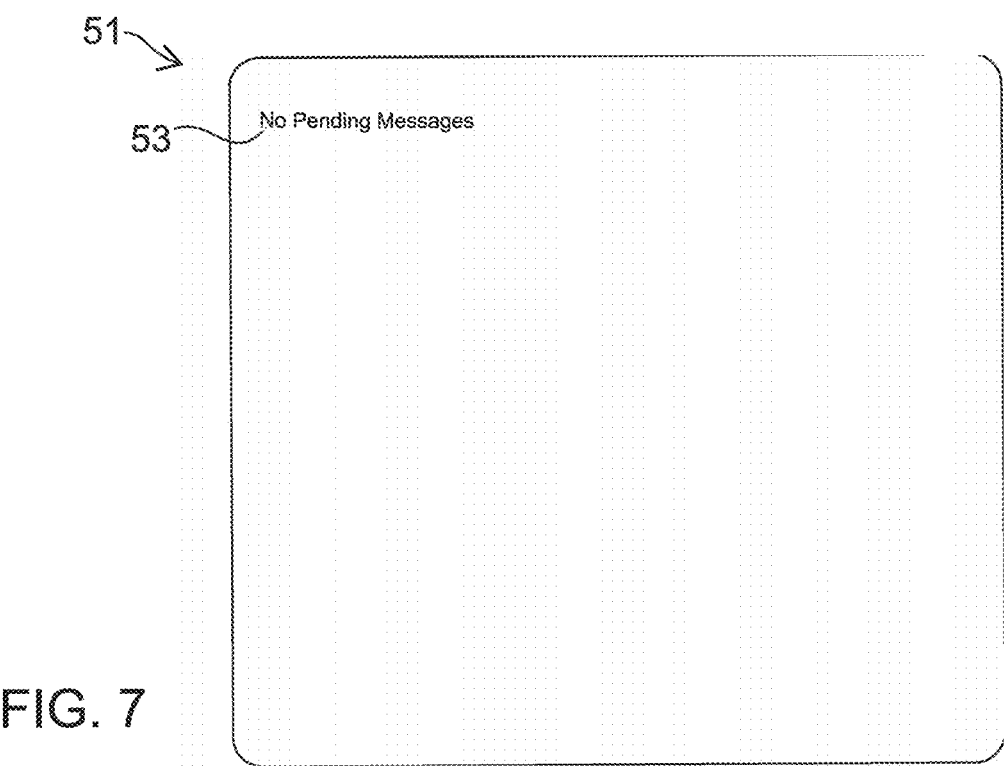
FIG. 7 shows the notification of a customer response on a secondary agent's notification display.

In various embodiments, a message lock is implemented as shown in FIG. 7 by removing the customer query 53 from the notification interface 51 of all non-responding agents (or secondary agents) for that agency.

Figure 8:
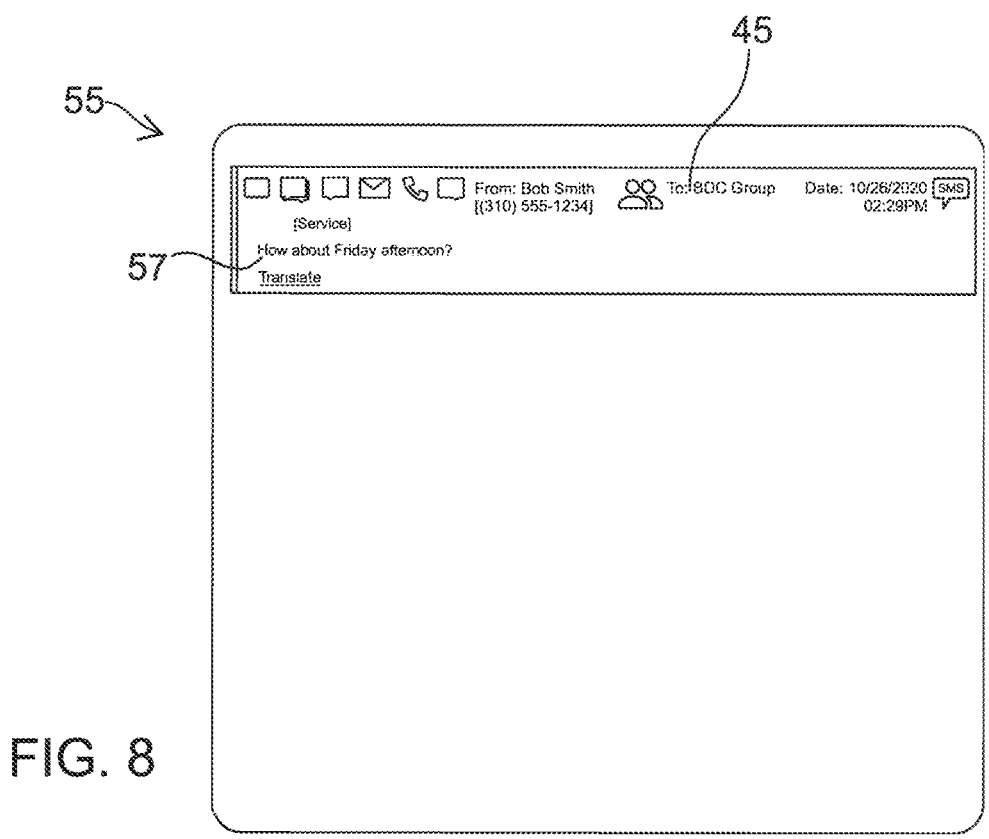
FIG. 8 shows the notification of a customer response on a primary agent's notification display.
Figure 9:
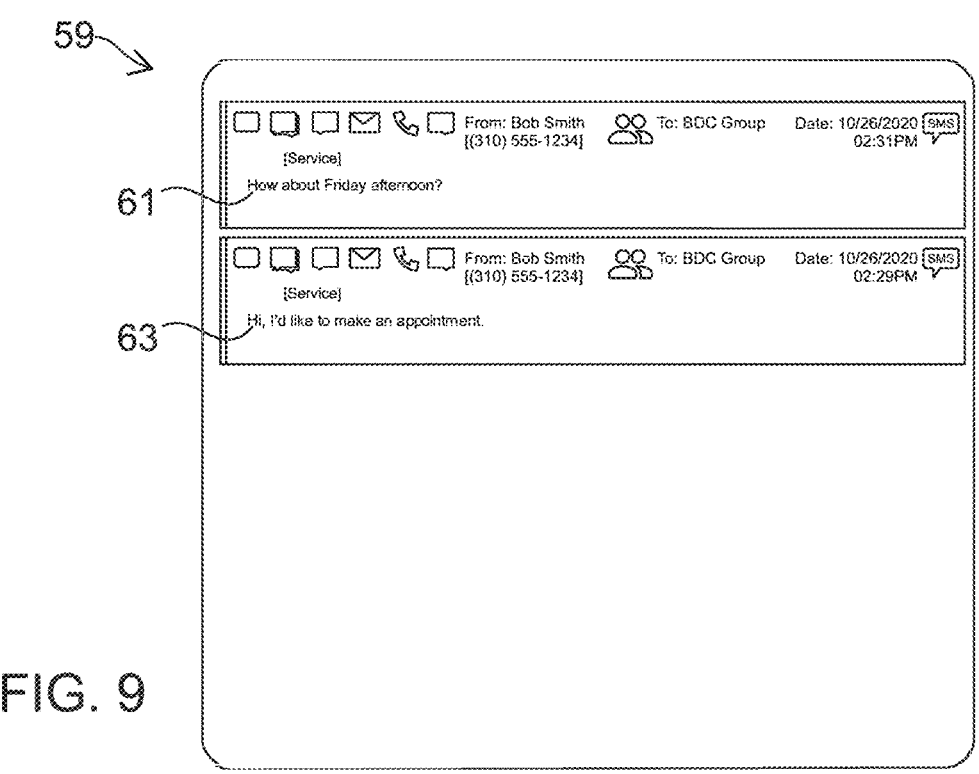
FIG. 9 shows the locked indication and locked notification for an agent attempting to respond to the customer request.

Subsequent to the outgoing initial agent response, in this example a new inquiry from the customer is received, and if as in this case the response is received after a period for "locking" or assignment of the messaging to a specific agent, the message is distributed to all relevant agents in the agency. Shown in FIG. 8 is an exemplar notification user interface 55 for the secondary or non-responding agents showing only the new incoming customer request 57. Shown in FIG. 9 is the notification user interface 59 for the primary or responding agent. In this embodiment, notifications of both the original message 61 from the customer and the follow-up message 63 from the customer are shown.

Figure 10:
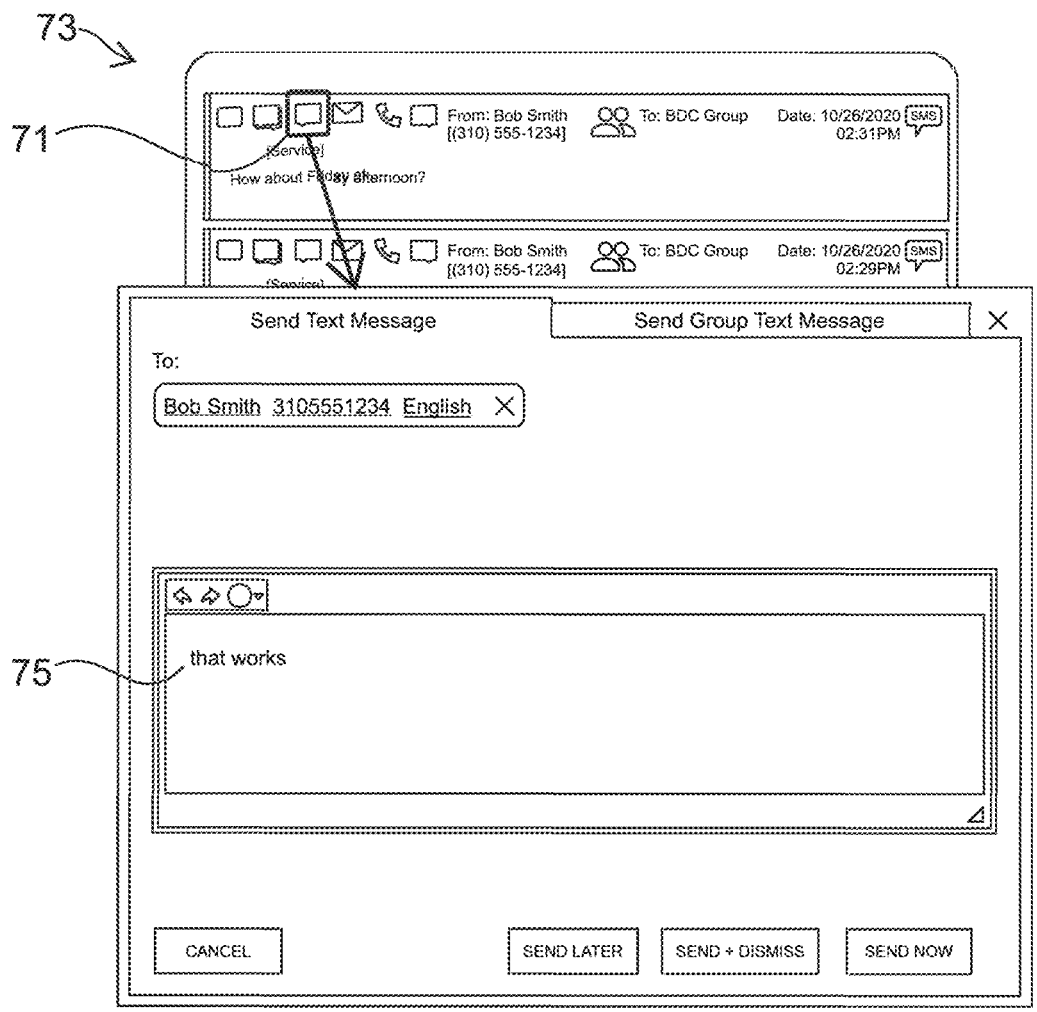
FIG. 10 shows the primary agent notification display while drafting the follow-up response to the customer.

Shown in the notification interface 71 in FIG. 10, the primary agent or responding agent has clicked the icon 73 to respond 75 by SMS text to the customer.

Figure 11:
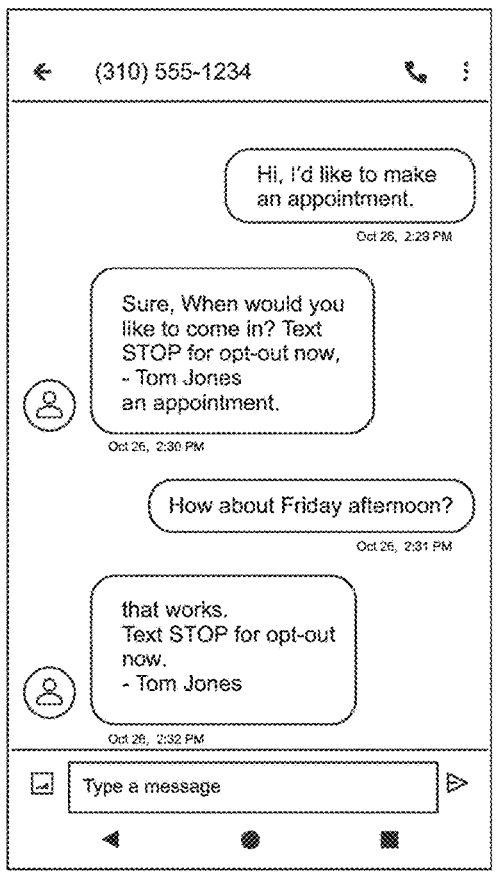
FIG. 11 shows the messaging display of a customer's smart phone showing the messaging interactions with the customer service agent(s).

Shown in FIG. 11 for illustration is the customer's perspective of the communications with the responding agent(s). In various embodiments, any responding agent's messages will appear in the same message thread on a customer's device. Customers are thus able to communicate with any number of agents using a standard messaging interface where messages and interactions are threaded together.

Figure 12:
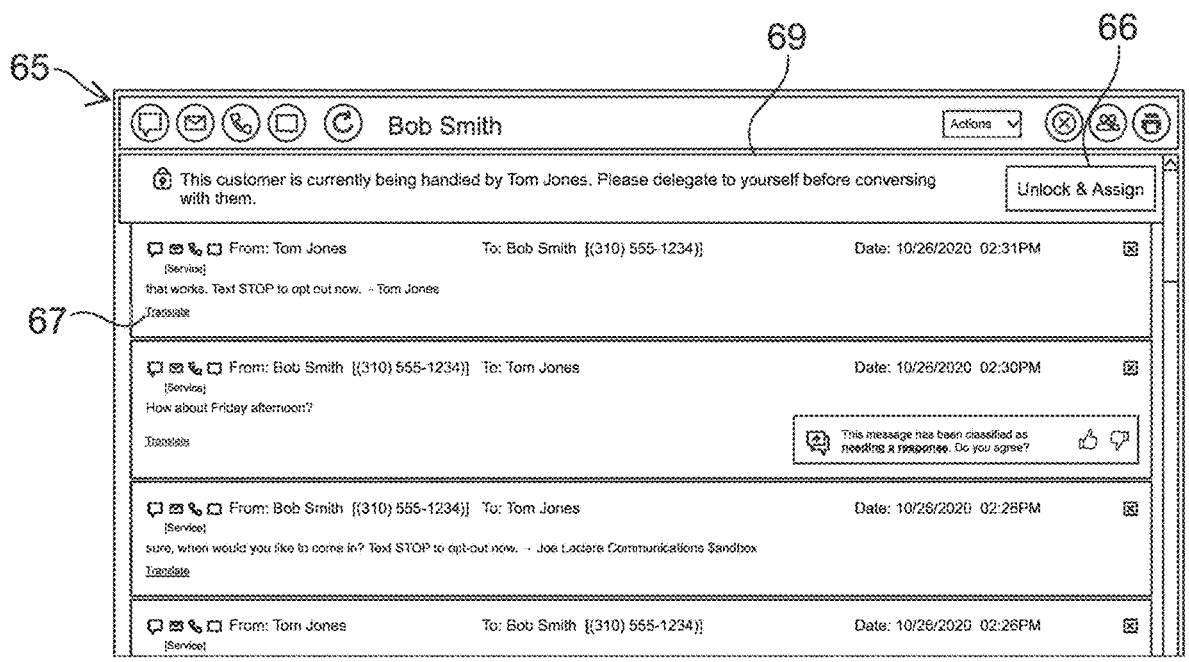
FIG. 12 shows the agent full communication thread display for an individual customer's interactions.

As shown in FIG. 12, apart from the notification interface, customer/agent communication threads are available to agents through the communication thread interface 65. The communication thread shown in FIG. 12 corresponds to the above-described correspondence between the responding agent "Tom Jones" 67 and the named customer. In various embodiments, communications between the primary or responding agent and customer are locked 69 restricting engagement between that agent and the customer. In various embodiments that lock persists for a determined time period. In the shown version, an agent viewing the thread is provided an ability to unlock the thread and engage with the customer 66.

Figure 13:
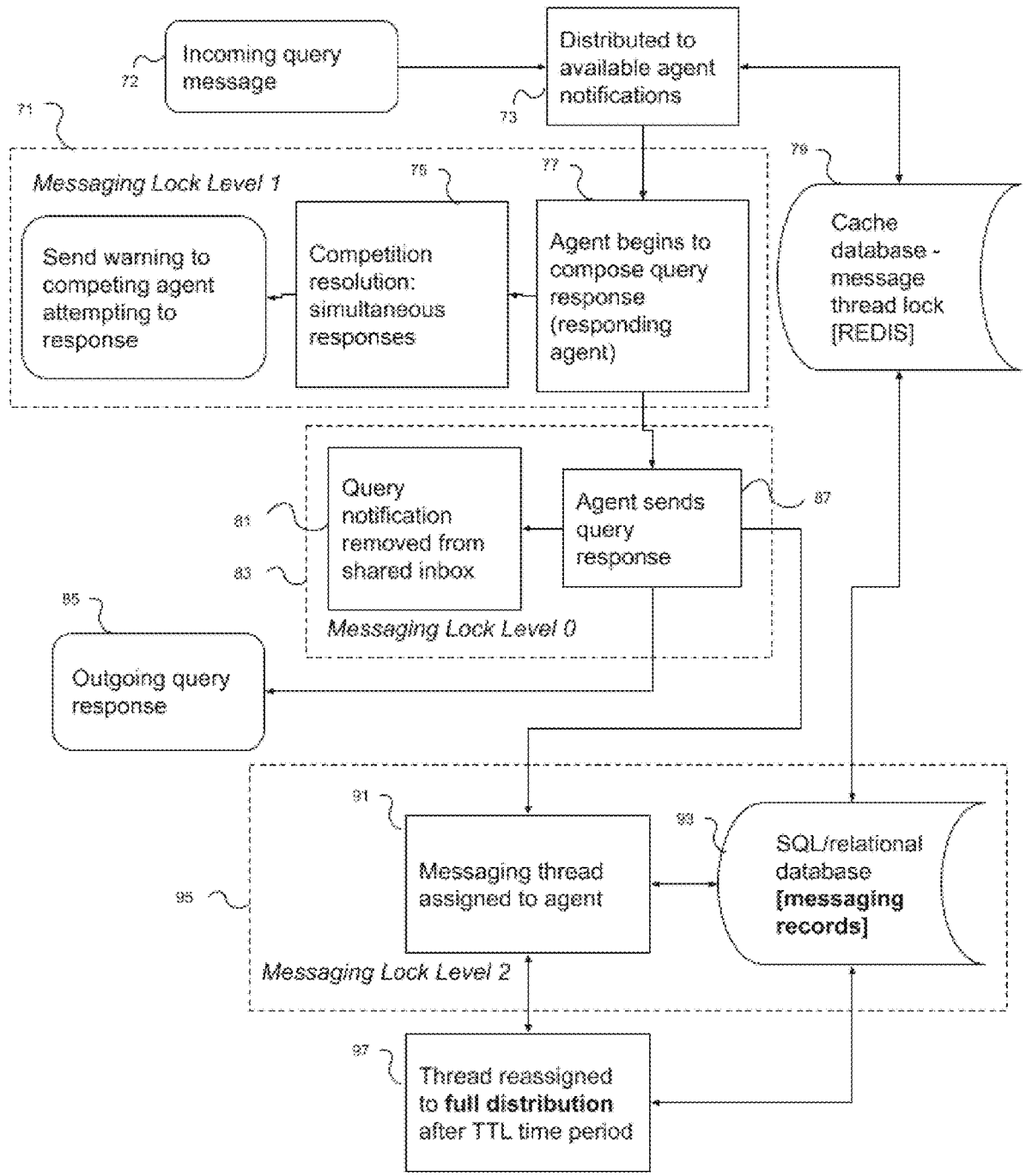
FIG. 13 shows a flowchart of the agent notification process and messaging lock/level for an individual agent.

FIG. 13 depicts a flow chart which represents a simple embodiment of the system to achieve customer coverage of incoming service requests, and to adaptively provide for messaging continuity by resolving conflicts and the use of so-called message "locks". In a typical communication process, an incoming customer message begins the process 72. In various embodiments, a centralized agency contact number may be provided directly to a customer, by advertising, email, or is otherwise communicated. In other embodiments, a short code is provided. Incoming messages are processed first by the inbound message rules engine to determine how and to whom the message will be sent, how the message will be classified, and if it should be cached or put in long term storage. Once processed, the message request is distributed to one or more agents for customer "coverage" 73. Message thread ownership are stored both in a write-through message cache 79 and the associated database 93. Incoming queries from customers are first distributed to available agents at the appropriate agency as shown above. As shown, the incoming messages first arrive in the "notification" portion of the messaging system. Once an available agent decides to respond, they click the response mode icon (shown above) and begin composing the response 77. This action triggers a "lock" to resolve competition with other agents that may be considering responding to the request 75. Should competing agents wishing to respond make such an attempt, they would be blocked from responding and receive an appropriate warning message from the system 74. Resolving this conflict or competition is referred to as the messaging lock level 1, 71. Once the responding agent sends the message 87, a secondary phase of the lock is entered which removes the customer inquiry form the notification interfaces of the non-responding agents. At this point, the response is thus sent to the customer 85, identifying the responding agent. In various embodiments of the system, once a responding agent is indicated, a secondary messaging lock 95 is put in place which assigns "ownership" of communications with the customer to the responding agent 91. Messaging threads between the agency and a customer are recorded in various embodiments in a SQL relational database 93 as detailed below. In various alternative embodiments, this secondary lock level may be removed after a set "time to live" period, after which incoming messages from the same customer are reverted to full distribution across available agents 97.

Figure 14:
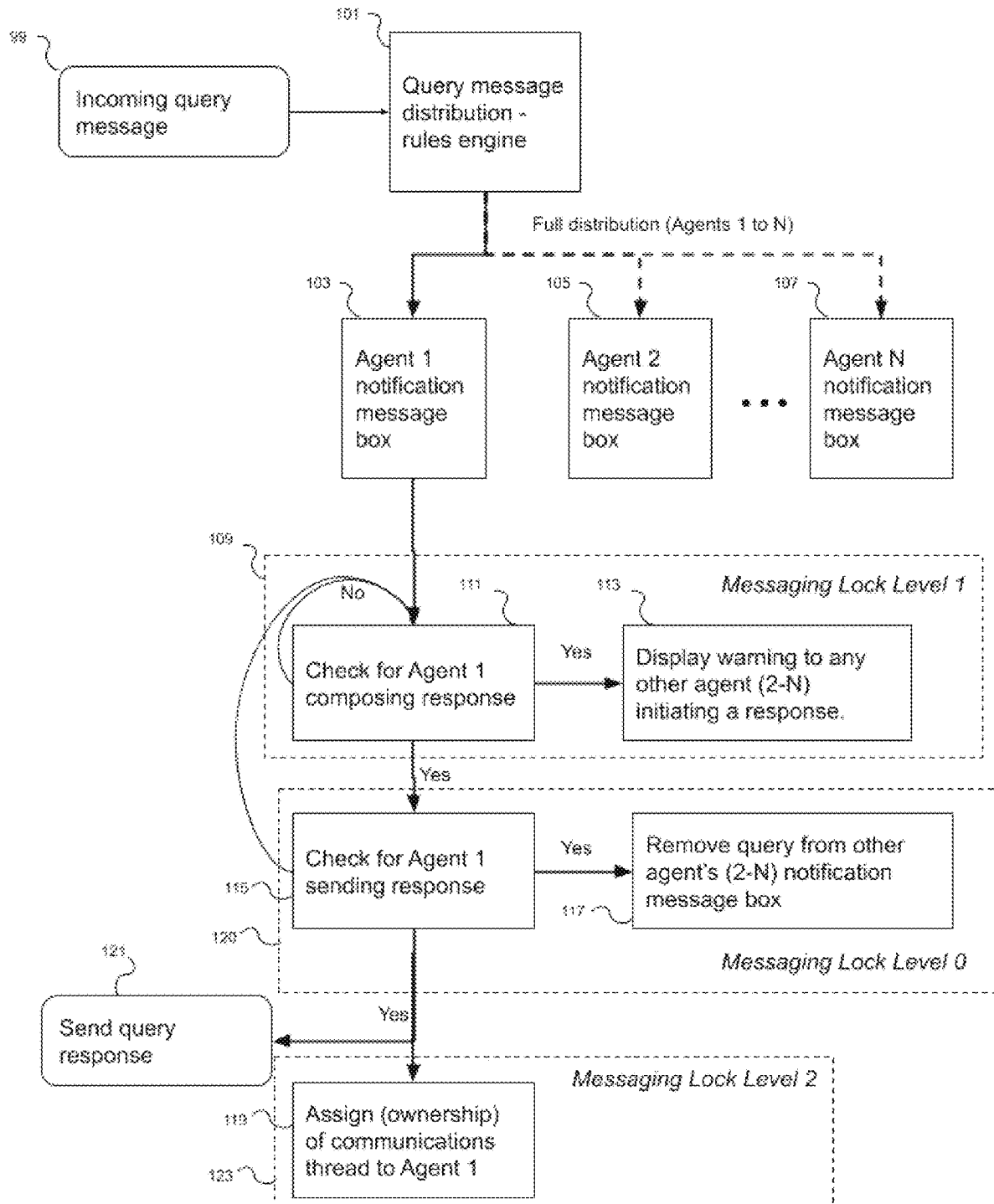
FIG. 14 shows a flowchart of the customer messaging distribution and agent notification process and messaging lock/level.

An alternative explanatory flow chart focused on the notification aspects of the messaging process is shown in FIG. 14. Like the previous chart, the process begins with a customer sending a message query to an agency requesting information or services related to the agency 99. As with the previous example, incoming messages are first processed by a rules engine which determines how the message is distributed 101. The rules engine, based in part on any applicable "lock" level in place, distributes the incoming message to the single responding agent 103 or to all available agents 102 107. Such incoming messages are first encountered by agents through their messaging notification interface.

The system then monitors agent notification interfaces for any agents who initiate composing a response 111, an action which as previously explained triggers a messaging lock 109, preventing other agents from responding and triggering a warning message 113 to any non-responding agent initiating a response through the notification interface.

The system then monitors the responding agent's notification interface for an action indicating the message is sent. Although not technically an additional "lock" 120, once the responding agent has completed the requisite respond and actually sends out the response 115, the system removes the customer query from the notification interfaces of the non-responding agents 117, uncluttering their interface so that they may be focused on customers awaiting service or otherwise engaged by that agent. Once the response is sent 121, in various embodiments of the system, engagement or communications between that customer and that agent is locked, perhaps temporarily, such that subsequent engagement is focused between that agent and that customer. This process is referred to as customer thread "ownership".

Figure 15:
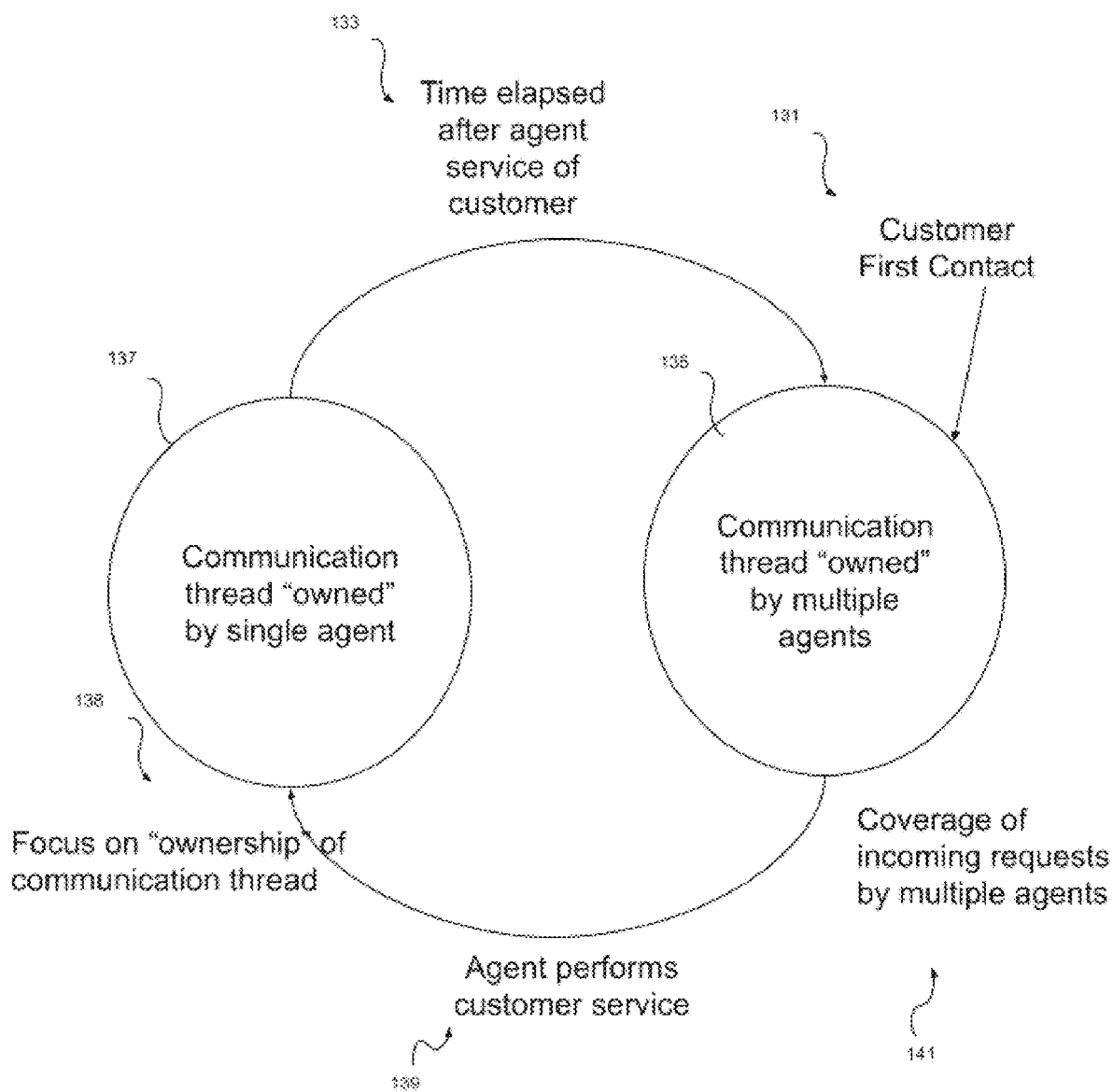
FIG. 15 shows a state diagram for an embodiment which utilizes a time to live period for individual agent/customer thread ownership.

The relationships between customer query coverage, communication thread ownership and concurrency management are outlined by means of a state diagram in FIG. 15. As shown in the diagram, two primary states are provided, one where communication engagement with a customer is "owned" by a single responding agent 137, and a second state where customer engagement is "owned" by the group of available agents 135 in which any available agent may respond to the customer. The communication engagement state is initially in the "multiple" ownership state 135 following the receipt of an initial customer request 131. This state of the system provides customer "coverage" by allowing multiple agents to service a particular customer 141. Responding to or "servicing" a customer by an agent 139, in various embodiments transitions the system to the other state 137 in which the customer engagement communications are "owned" by the responding agent. This state provides a focus on individual customer service 138, providing the customer a more directly engaged and focused experience, improving the performance and efficiency of the service. In various embodiments, after service by the agent is completed and a chosen period of time elapses 133, future engagements by that customer are addressed by the "coverage" state 135.

In various embodiments, the rules engine is configurable to specify what action or event constitutes a "thread owning event" in which the customer communications are assigned to a specific agent or group of agents. Note that as explained above, the thread owner may be an individual or group. A simple illustrative example is when an agent responds to a new incoming customer query. The engine may be configured to indicate a "default" thread owner according to the messaging rules. In alternate configurations, the thread owner is an individual agent or a group of agents. This configuration capability provides an ability to maximize the ability to cover inbound queries that may be addressed by a group of agents or may be locked specifically to an individual agent when such binding is necessary for the context of the communication. In the following example, the default thread owner is determined as a function dto(x). Exemplar agents are u and v. Exemplar customer is c. In this example, once the thread is owned, the next incoming communication is routed to the agent that owns that communication thread.

If dto(u)=u, then, u themselves own the thread.

If dto(u)=v (could be a group, or an agent), then route to dto(v).

If dto(u)=null, then ignore the event by u.

Thus, in this example, when an inbound communication comes from customer c the system may be configured to:
 check the agent attached to the most recent "thread owning event" for c;
  ownership action by agent a;
  explicit delegation to agent u (whether manual or automated);
  outbound communication by agent u;
 for an event's agent u, check if dto(u) ultimately computes to a non-null value;
 if dto(u) is non-null, route message to u, notify u (or members of u, if u is a group);
 if dto(u) is null, move on to the next recent event;
 if all events are exhausted, assign to default_thread_owner(department).

In various embodiments, agents perform actions with respect to the customers which make continued interaction with the same agent necessary or highly desired. Such an event is among the "thread owning" "action" events identified herein. For example, in a retail service environment, an order may be opened by a customer with an agent prior to the performance of service. Defined herein this would make the agent a transactional since the agent has initiated a transaction with the customer.

Another example of a "thread owing" event happens when the agent specifically requests or delegates a thread to himself, herself, or another agent. This is mentioned above as an explicit delegation of the thread.

A third type of "thread owning" action or event as has been identified above is the action of initiating sending an outbound message, or in certain embodiments initiating composition of an outbound message.

In certain applications, an event may have no effect on thread ownership, so-called "null" events.

Figure 16:
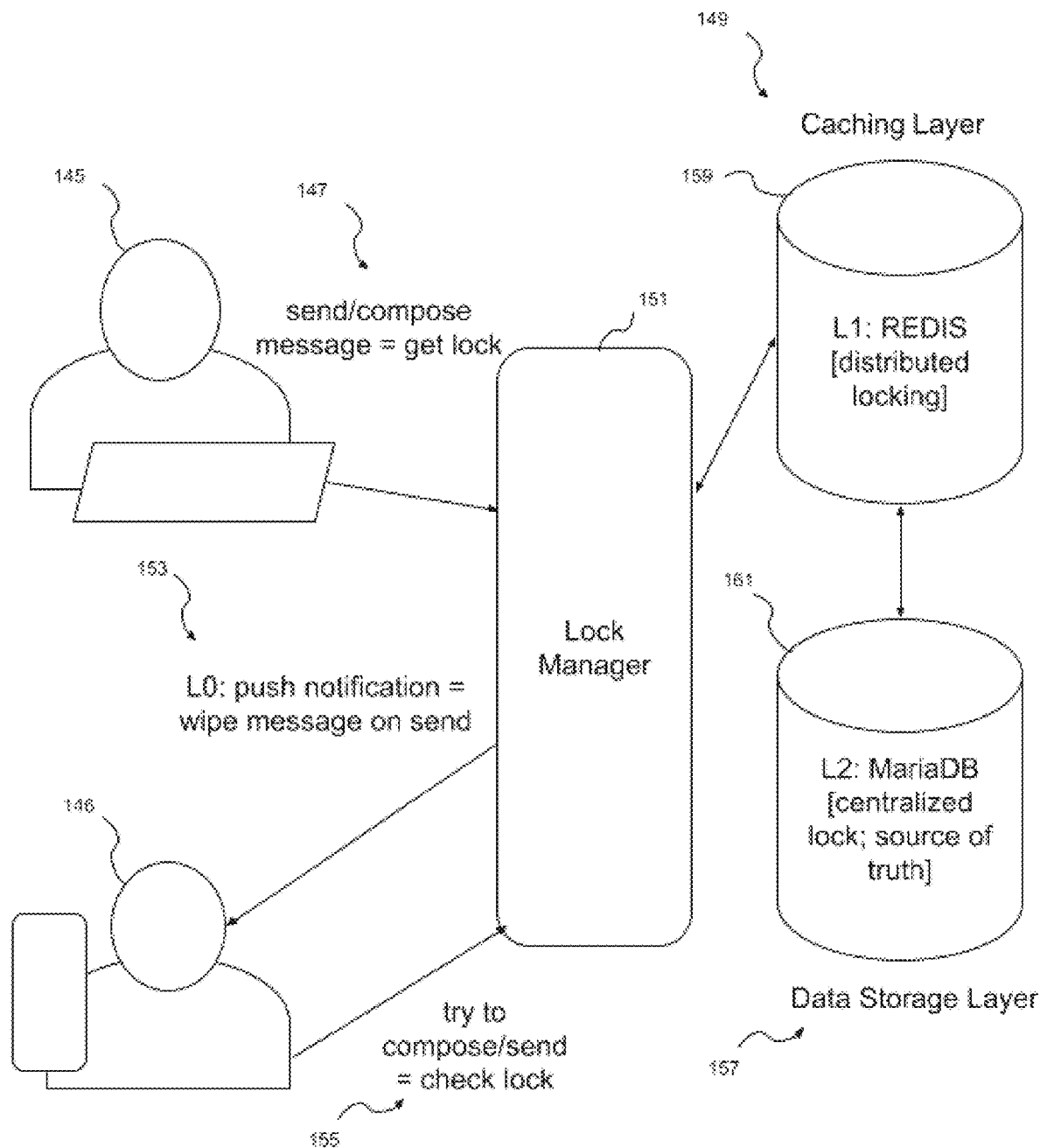
FIG. 16 depicts a diagram of the interactions between components of the system and customers.

As an illustration of the "locking" system components, FIG. 16 diagrams several such components including relevant implementation improvements which address system performance. In this diagram, servicing agents 145 146 are shown with PC workstation and smartphone options for servicing customers. Interactions with the agents operate through a so-called "lock manager" 151 responsible for controlling the distribution and ownership of customer engagement. During the composition of messages or when such messages are sent 147, the lock manager modifies the lock condition to prevent messages from being sent or composed by other agents 155 or to wipe the engagement message from agent notification interface 153. In various embodiment implementations, incoming message thread locks are cached 149 at level one (L1) 159 to provide simple and rapid access performance during engagement. In various embodiments, the L1 cache is implemented utilizing a REDIS database. As the state of the message thread lock changes, the message thread locks are updated across the data storage systems. In certain embodiments, MariaDB is utilized as the database implementation framework.

Figure 17:
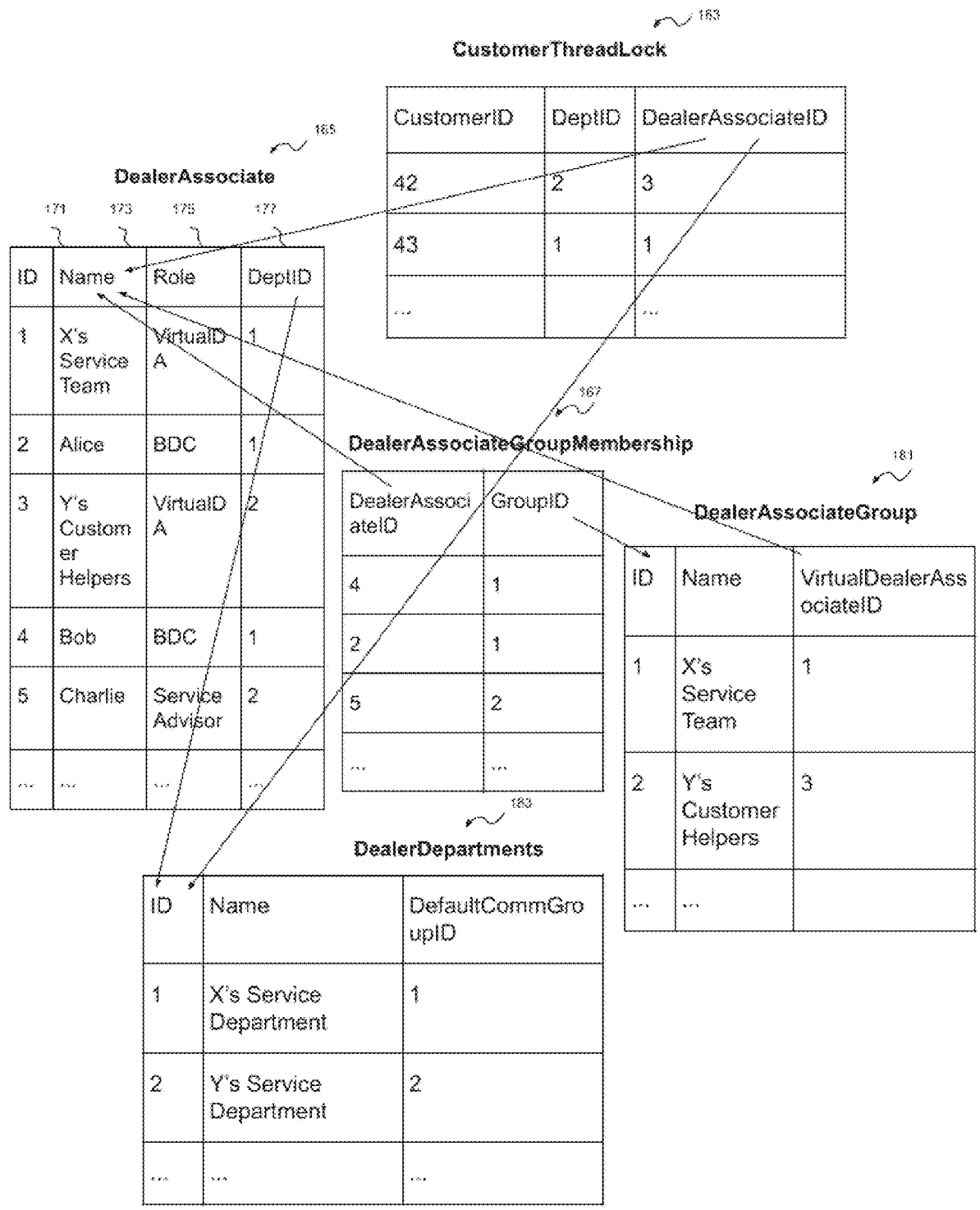
FIG. 17 shows an exemplar entity-relationship (ER) diagram for an embodiment of the system utilized for dealerships/agents and customers.

In an exemplar implementation, customers of automobile service departments are interested in obtaining service appointments from dealerships. FIG. 17 shows an exemplar entity-relationship diagram outlining how various data is structured for such an implementation. In this implementation, "dealerships" have the role of agencies as described above. Dealerships may be divided into departments. Dealer associates 165 are the agents and have roles as service advisors or business development center (call center) operators. Dealer associates may be identified by various attributes as shown ID# 171, name 173, role 175 and department ID 177. Dealership departments 183 are identified by number ID, name and default communication group ID. Dealer associates are divided into groups, which are identified by the associate's membership. Lastly, customers are identified by customer ID, the associated engagement department ID and the ID of the engagement dealer associate. These records are utilized to update the engagement thread "owned" by a particular dealer associate in the customer thread lock table 163.

In alternate embodiments, incoming messages are distributed to the full agent group covering the incoming communication, however, a preferred or recommended agent may be indicated for the particular communication according to a recommendation process which may be based on a variety of factors such as the nature of the interaction history, the timing of the incoming message, and the availability of a particular agent. The recommendation or preference process may be rule based or may utilize machine learning. Once the recommended agent is determined, the recommended agent is notified through the user interface by text, highlighting or other flagging of the incoming message. Similarly, if a recommended agent is determined, the non-recommended agents may be notified through their notification user interfaces to indicate that another agent has been notified as the recommended responding agent.

Figure 18:
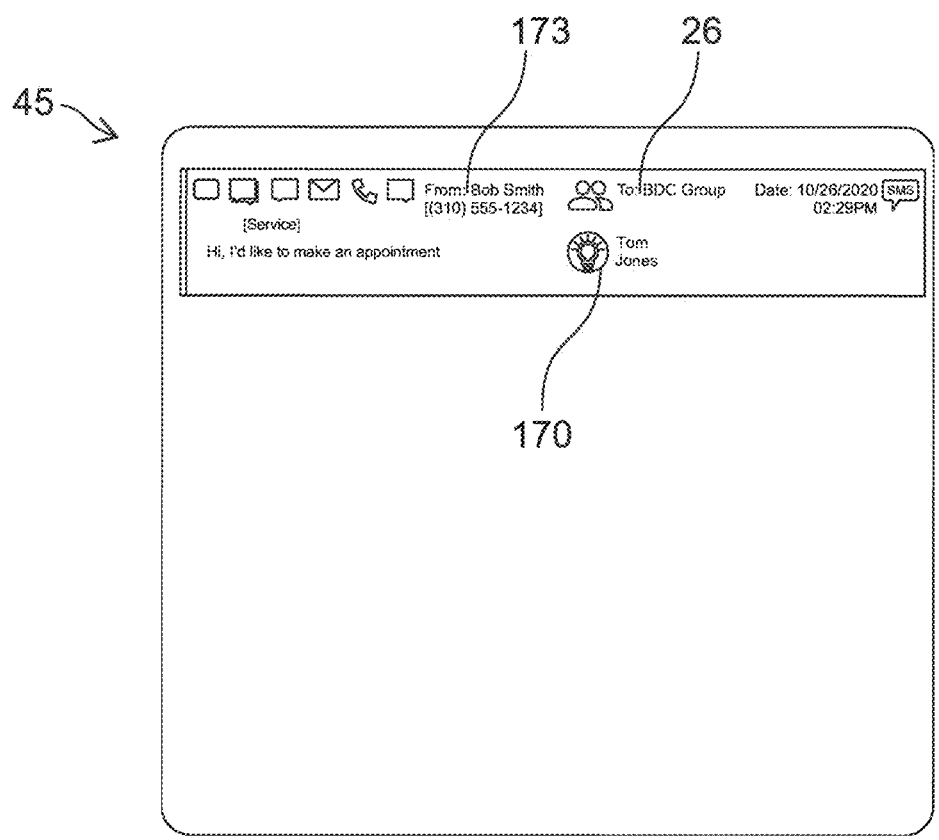
FIG. 18 shows an exemplar notification user interface for an agent indicating the preferred agent for replying to a customer inquiry.

A user interface implementation of the above feature is shown in FIG. 18. In this example, the preference algorithm has determined that agent "Tom Jones" is the preferred agent for responding to the incoming message. For this example, as shown in the notification window 45, the incoming message/query is sent from customer "Bob Smith" 173, and is distributed according to the incoming message rules for this customer, to the "Service BDC Group" 26. In this instance, the incoming message distribution router has also determined by use of a preference algorithm, that the agent "Tom Jones" is the preferred agent for handling the request. This is indicated to all available agents in the "Service BDC Group" by the use of an indicating icon (light bulb) next to the preferred agent's name. Many user interface options are available to convey this information. For example, a pop-up box could be used, icon or buttons may be highlighted or animated to indicate the preferred agent and/or the preferred channel (text/email/voice) for responding to the customer. Unlike the "locks" described above, the use of the intelligent agent preference routing does not modify the message routing at this point in the process, only the preferred agent is identified. Factors for determining the preferred agent are identified in the next figure.

Figure 19:
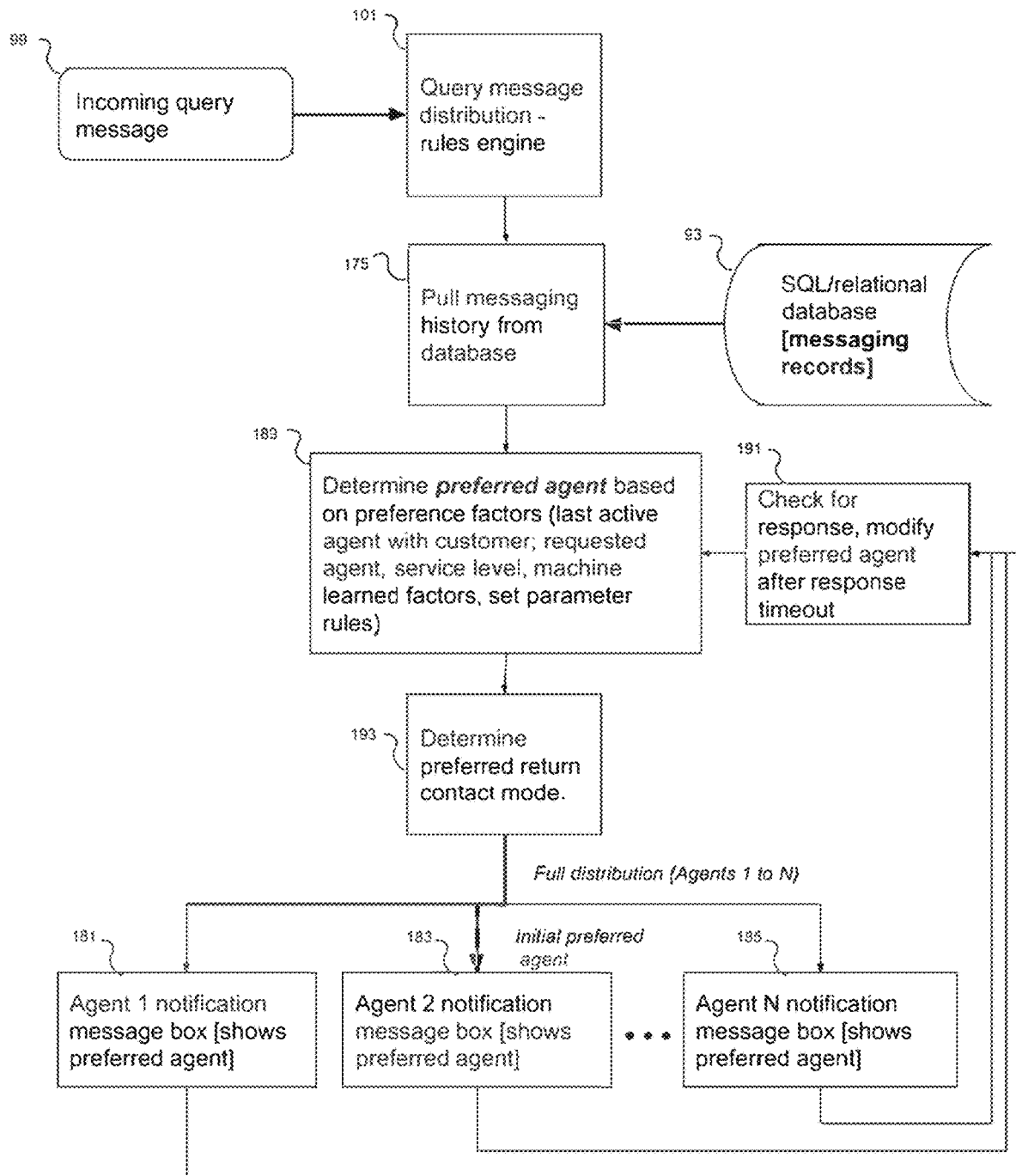
FIG. 19 shows a flow-chart for the process of determining a preferred agent to respond to a customer inquiry based on available information about the customer interaction history.

A simplified algorithm identifying some of the factors available for the incoming message router to determine a preferred agent are shown in FIG. 19. As was shown in the previous figures, in various embodiments, incoming queries 99 to the system are first processed by a component (query message distribution rules engine 101) which determines the recipient or group of recipients of the query message. In various versions of this embodiment which utilizes the preferred agent component, a preferred recipient is determined initially 175 by algorithm which may utilize interaction/messaging history 93 for the customer, among other records. To determine the primary and optionally secondary, etc. contact or recipients, the preference decision component 189 may use a rules engine alone or in combination machine learning which utilizes as parameters one or more factors such as the last agent to service the customer, the last agent to facilitate a completed transaction with the customer, an agent on file as requested as the preferred agent by the customer, etc.. In an optional module of the preference decision component, a mode preference module 193 identifies a customer's preferred mode or modes of interaction with the service agents, particularly when multiple modes of interaction are preferred or where only certain interactions sent to a customer are preferred or requested. As in an example shown earlier, an initial query made by a customer may be distributed to all (or all available) agent members of a group 181 183 185. In optional versions of this embodiment, the system may monitor the response delay time from the initial query. If no response is detected after a predetermined patience limit 191, the preferred agent module may determine a secondary preferred agent, and the switch the preferred agent identified in the agent notifier user interface. By providing preferences to responding agents, the system allows for more rapid coverage of incoming queries, but also provides preference information for responding agents to improve the customer interaction experience. In alternative embodiments, the notification user interface may include other information relevant to a particular customer, such as a preferred name to be addressed by, for example illustrated in FIG. 18, the service agents are shown "Bob" or "Dr. Smith" under the customer's identification as the customer's preferred name to be addressed by.

Figure 20:
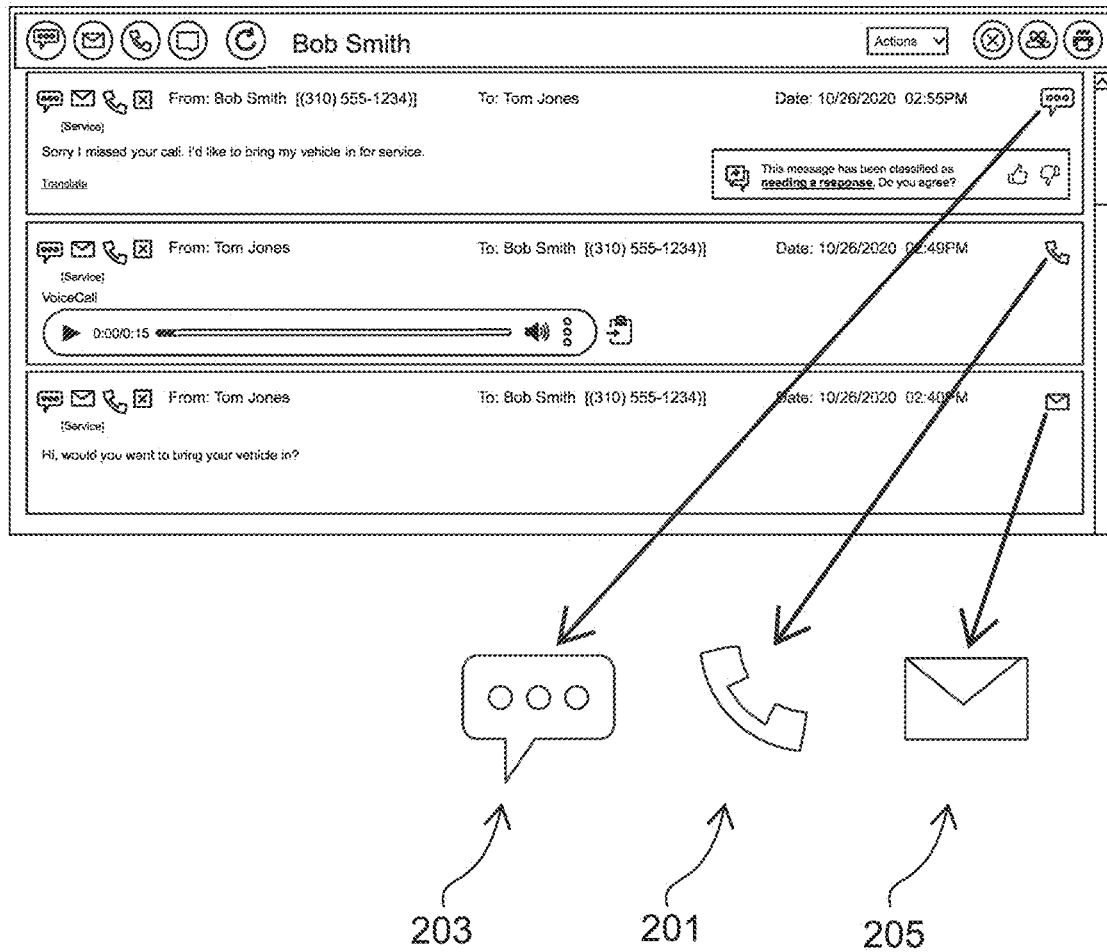
FIG. 20 shows an exemplar user interface for an agent showing threaded interactions including text messages, voice calls and email from a customer.

As described above, in addition to text-based messaging, other channels of customer/agent interactions or communications may be handled by the above disclosed system and process within the context of a communication thread. Communications among all available channels are threaded together as incoming and outgoing interactions. FIG. 19 shows an exemplar user interface for an agent's view of a customer interaction thread containing phone 201, text message 203 and email communications 205. FIG. 20 shows 2 corresponding tables from an embodiment entity-relationship diagram which depicts the association or mapping between individual customers with multiple associated communication identifiers such as telephone numbers or email addresses. The Customer table 207 is shown depicting multiple customers and an associated ID, name and dealership (store). Also shown is the CustomerCommunication table 209, which depicts the communication channel identifications of individual customers, including the Customer-Communication ID 211 and the associated communication identifier (CommValue) 213, communication channel type (CommType) 215 and customer ID 217. The Customer ID links back to the Customer table as shown. By utilizing linked tables such as those shown, the system is able to thread both inbound and outbound interactions between an agent and customer associated with a Customer ID.

In alternate embodiments, agent notifications are sent to agents in a form which may be alternatively displayed in a web application, a thin application, a mobile or other app or by a resident notification handling processes of the agent device operating system, such as the Generic Notification handler for android devices and the analogous notification handling processes for iOS, Windows and MacOS. In various embodiments, received messages by agent devices are processed as push notifications.

In alternate embodiments, communications from customers are chat messages, email messages, instant messaging messages, email, in-app messaging, voice calls, video calling, video or audio conferencing calls or a combination of the above.

Although in this example, the agency is a dealership group or department, many customer and business engagements may be utilized in various embodiments. In such alternative embodiments, the agency may be providing technical support, sales, sales support, appointments, shipping service and support, package tracking, surveys, promotional support, product support, repair service support, retail follow-up, product inquiries, warranty support, service appointments, health care support and health care appointments.

The routines and/or instructions that may be executed by the one or more processing units to implement embodiments of the invention, whether implemented as part of an operating system or a specific application, component, program, object, module, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object-oriented programming language such as Java, Smalltalk, C++or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What has been described herein is considered merely illustrative of the principles of this invention. Accordingly, it is well within the purview of one skilled in the art to provide other and different embodiments within the spirit and scope of the invention.

We claim:

1. A method for adaptive inbound communication routing comprising:
   receiving an inbound communication having no unique recipient agent identification from a customer on a communication routing engine;
   identifying a source customer identity of the inbound communication;
   retrieving a communication history record associated with the source customer from a communication records database;
   determining a current thread owner for the inbound communication according to a configurable rules engine based at least in part on the source customer identity, wherein the current thread owner comprises one or more current thread agents;
   routing the inbound communication to the current thread owner;
   displaying the inbound communication in a notification user interface to the current thread owner;
   receiving a composition event signal from the associated messaging user interface of the composing agent indicating that the composing agent has initiated composition of a response communication to the inbound communication;
   locking an ability of any of the one or more current thread agents not the composing agent from initiating composition of a competing response to the inbound communication in an associated competing communication user interface;
   receiving a send event signal from the associated messaging user interface of the composing agent indicating that the composing agent has initiated a send event for the response communication;
   removing the inbound communication from the notification user interface of the one or more thread agents not the composing agent.

2. The method of claim 1 wherein the communication comprises text messaging.

3. The method of claim 1 wherein the communication comprises voice telephony.

4. The method of claim 1 wherein the communication comprises e-mail.

5. The method of claim 1 also comprising: updating the communication records database.

6. The method of claim 1 also comprising: storing records identifying the current thread owner in a communication records cache.

7. The method of claim 1 also comprising: storing records identifying the composing agent in a communication records cache.

8. The method of claim 1 wherein determining the current thread owner also comprises:
   evaluating a communication time lag period from a previous inbound or outbound communication from or to the source customer; and
   modifying the current thread owner as a function of the communication time lag period.

9. The method of claim 1 wherein determining the current thread owner also comprises receiving a transactional event signal indicating a transactional event has been performed by a transactional agent.

10. The method of claim 6 also comprising: modifying a communication records cache to identify the current thread owner as the transactional agent.

11. The method of claim 6 also comprising: wherein the inbound communication to the current thread owner is combined into a single customer communication thread user interface comprising inbound communications from the customer from the and outbound communications to the customer comprising one or more text messages, recorded voice telephone calls or e-mails.

12. A system for adaptive inbound communication routing comprising:

a memory containing machine readable medium comprising machine executable code having stored thereon instructions for a message management component, a notification management component, and a notification management component; and a processor coupled to the memory to execute the machine executable code;

wherein the message management component:

receives an inbound communication having no unique recipient agent identification from a customer on a communication routing engine;

identifies a source customer identity of the inbound communication;

retrieves a communication history record associated with the source customer from a communication records database;

determines a current thread owner for the inbound communication according to a configurable rules engine based at least in part on the source customer identity, wherein the current thread owner comprises one or more current thread agents;

receives a composition event signal from the associated messaging user interface of the composing agent indicating that the composing agent has initiated composition of a response communication to the inbound communication;

locks an ability of any of the one or more current thread agents not the composing agent from initiating composition of a competing response to the inbound communication in an associated competing communication user interface;

receives a send event signal from the associated messaging user interface of the composing agent indicating that the composing agent has initiated a send event for the response communication;

removing the inbound communication from the notification user interface of the one or more thread agents not the composing agent;

wherein the message routing component routes the inbound communication to the current thread owner;

wherein the notification management component sends a notification display comprising the inbound communication in a notification user interface to the current thread owner.

13. The system of claim 12 wherein the communication comprises text messaging.

14. The system of claim 12 wherein the communication comprises voice telephony.

15. The system of claim 12 wherein the communication comprises e-mail.

16. The system of claim 12 wherein the message management component also updates the communication records database.

17. The system of claim 12 wherein the message management component also stores records identifying the current thread owner in a communication records cache.

18. The system of claim 12 wherein the message management component also stores records identifying the composing agent in a communication records cache.

19. The system of claim 12 wherein the message management component also determines the current thread owner by evaluation of a communication time lag period from a previous inbound or outbound communication from or to the source customer; and modification of the current thread owner as a function of the communication time lag period.

20. The system of claim 12 wherein the message management component also determines the current thread owner by reception of a transactional event signal indicating a transactional event has been performed by a transactional agent.

21. A non-transitory machine-readable storage medium having stored thereon instructions comprising machine executable code, which when executed by a machine, causes the machine to:

receive an inbound communication having no unique recipient agent identification from a customer on a communication routing engine;

identify a source customer identity of the inbound communication;

retrieve a communication history record associated with the source customer from a communication records database;

determine a current thread owner for the inbound communication according to a configurable rules engine based at least in part on the source customer identity, wherein the current thread owner comprises one or more current thread agents;

route the inbound communication to the current thread owner;

display the inbound communication in a notification user interface to the current thread owner;

receive a composition event signal from the associated messaging user interface of the composing agent indicating that the composing agent has initiated composition of a response communication to the inbound communication;

lock an ability of any of the one or more current thread agents not the composing agent from initiating composition of a competing response to the inbound communication in an associated competing communication user interface;

receive a send event signal from the associated messaging user interface of the composing agent indicating that the composing agent has initiated a send event for the response communication;

remove the inbound communication from the notification user interface of the one or more thread agents not the composing agent.

* * * * *